US008859447B2

(12) United States Patent
Itoi et al.

(10) Patent No.: US 8,859,447 B2
(45) Date of Patent: Oct. 14, 2014

(54) COLUMNAR ALUMINUM TITANATE AND METHOD FOR PRODUCING SAME

(75) Inventors: Nobuki Itoi, Tokushima (JP); Hiroyoshi Mori, Tokushima (JP); Takahiro Mishima, Tokushima (JP); Hidetoshi Ogawa, Tokushima (JP)

(73) Assignee: Otsuka Chemical Co., Ltd., Osaka-shi (JP)

( * ) Notice: Subject to any disclaimer, the term of this patent is extended or adjusted under 35 U.S.C. 154(b) by 112 days.

(21) Appl. No.: 13/583,114

(22) PCT Filed: Mar. 26, 2010

(86) PCT No.: PCT/JP2010/055376
§ 371 (c)(1),
(2), (4) Date: Sep. 6, 2012

(87) PCT Pub. No.: WO2011/118025
PCT Pub. Date: Sep. 29, 2011

(65) Prior Publication Data
US 2012/0329634 A1    Dec. 27, 2012

(51) Int. Cl.
*C04B 35/00* (2006.01)
*C01G 23/00* (2006.01)
*C04B 35/478* (2006.01)

(52) U.S. Cl.
CPC ....... *C01G 23/003* (2013.01); *C04B 2235/3418* (2013.01); *C01P 2004/03* (2013.01); *C04B 2235/3234* (2013.01); *C01P 2004/54* (2013.01); *C01P 2002/50* (2013.01); *C01P 2002/72* (2013.01); *C04B 2235/5436* (2013.01); *C04B 2235/3206* (2013.01); *C04B 2235/788* (2013.01); *C04B 2235/3217* (2013.01); *C04B 35/478* (2013.01); *C04B 2235/80* (2013.01); *C04B 2235/81* (2013.01); *C04B 2235/9607* (2013.01); *C01P 2004/61* (2013.01); *C04B 2235/3232* (2013.01)
USPC .......................................... 501/134; 501/135

(58) Field of Classification Search
CPC ...... C04B 35/46; C04B 35/495; C04B 35/47; C04B 35/465
USPC ........................................ 501/134, 135, 136
See application file for complete search history.

(56) References Cited

U.S. PATENT DOCUMENTS 6,013,238 A * 1/2000 Murata et al. ................. 423/598
2006/0009347 A1 1/2006 Fukuda et al.
(Continued)

FOREIGN PATENT DOCUMENTS

CN 101456729 A 6/2009
JP 56-041883 A 4/1981
(Continued)

OTHER PUBLICATIONS

International Search Report of PCT/JP2010/055376, mailing date May 25, 2010.
(Continued)

*Primary Examiner* — Noah Wiese
(74) *Attorney, Agent, or Firm* — Westerman, Hattori, Daniels & Adrian, LLP

(57) ABSTRACT

Provided are aluminum titanate capable of providing a sintered body having a low coefficient of thermal expansion, a high porosity, and high mechanical strength, a production method of the same, and a sintered body of the columnar aluminum titanate. The columnar aluminum titanate has an average aspect ratio (=(number average major-axis length)/(number average minor-axis length)) of 1.5 or more and its magnesium content is preferably within the range of 0.5% to 2.0% by weight relative to the total amount of titanium and aluminum in terms of their respective oxides.

11 Claims, 9 Drawing Sheets

(56) References Cited

U.S. PATENT DOCUMENTS

| | | | |
|---|---|---|---|
| 2007/0224110 A1 | | 9/2007 | Fukuda et al. |
| 2010/0230870 A1* | | 9/2010 | Noguchi et al. ............... 264/624 |
| 2010/0298114 A1 | | 11/2010 | Maki et al. |
| 2011/0124484 A1 | | 5/2011 | Maki et al. |

FOREIGN PATENT DOCUMENTS

| | | | | | |
|---|---|---|---|---|---|
| JP | 57-003767 A | | 1/1982 | | |
| JP | 64-011162 A | | 1/1989 | | |
| JP | 01-249657 A | | 10/1989 | | |
| JP | 03-242371 A | | 10/1991 | | |
| JP | EP-0506475 A | * | 9/1992 | ............... | C04B 35/46 |
| JP | 04-305054 A | | 10/1992 | | |
| JP | 08-290963 A | | 11/1996 | | |
| JP | 2009-184903 A | | 8/2009 | | |
| WO | 2004/039747 A1 | | 5/2004 | | |
| WO | 2005/105704 A1 | | 11/2005 | | |
| WO | 2009/154219 A1 | | 12/2009 | | |

OTHER PUBLICATIONS

Japanese Office Action issued in corresponding Japanese Patent application No. 2008-290237, mailing date Aug. 7, 2012.

Japanese Office Action dated Oct. 23, 2012, issued in corresponding Japanese Patent Application No. 2008-290237 (2 pages).

Internatonal Preliminary Report on Patentability (Form PCT/IB/373) (1 page) of International Application No. PCT/JP2010/055376 issued date Oct. 23, 2012 with Form PCT/ISA/237 (4 pages), English Translation Only.

Japanese Office Action dated Jan. 29, 2013, issued in corresponding Japanese Patent Application No. 2008-290237 (2 pages).

Chinese Office Action dated Mar. 24, 2014, issued in corresponding Chinese Patent Application No. 201080065580.2 with English translation (14 pages).

* cited by examiner

COLUMNAR ALUMINUM TITANATE AND METHOD FOR PRODUCING SAME

TECHNICAL FIELD

This invention relates to columnar aluminum titanate, a method for producing the same, and a sintered body using the columnar aluminum titanate.

BACKGROUND ART

Aluminum titanate has low thermal expansivity, excellent thermal shock resistance and a high melting point. Therefore, aluminum titanate has been expected as a porous material used such as for a catalyst support for automobile exhaust gas treatment or a diesel particulate filter (DPF), and developed in various ways.

Patent Literature 1 proposes that in order to obtain a sintered aluminum titanate body stable at high temperatures, the surface of a green body made of aluminum titanate is coated with an oxide or solid solution of one or more metals selected from magnesium, iron, silicon, titanium, and aluminum.

Patent Literature 2 proposes that in order to produce a sintered aluminum titanate body stable at high temperatures, a magnesium compound and a silicon compound are added to aluminum titanate, the resultant mixture is then formed into a green body, and the greed body is sintered.

Patent Literature 3 proposes that in order to a sintered aluminum titanate body having high strength without impairing high melting point and low thermal expansivity characteristics possessed by aluminum titanate and less degradation in mechanical strength due to repeated thermal history, a substance formed by adding magnesium oxide and silicon oxide to aluminum titanate is sintered.

Patent Literatures 4 and 5 propose a method for producing a sintered aluminum magnesium titanate body in which not less than 10% by mole to less than 100% by mole magnesium is contained in the total amount of magnesium and aluminum.

CITATION LIST

Patent Literature

Patent Literature 1: JP-A S56-41883
Patent Literature 2: JP-A S57-3767
Patent Literature 3: JP-A H01-249657
Patent Literature 4: WO 2004/039747
Patent Literature 5: WO 2005/105704

SUMMARY OF INVENTION

Technical Problem

An object of the present invention is to provide columnar aluminum titanate capable of providing a sintered body having a low coefficient of thermal expansion, a high porosity, and high mechanical strength, a production method of the same, and a sintered body of the columnar aluminum titanate.

Solution to Problem

Columnar aluminum titanate of the present invention is characterized by having an average aspect ratio (=(number average major-axis length)/(number average minor-axis length)) of 1.5 or more, preferably 1.6 or more.

With the use of the columnar aluminum titanate of the present invention having an average aspect ratio of 1.5 or more, preferably 1.6 or more, a sintered aluminum titanate body can be obtained which has a low coefficient of thermal expansion, a large pore diameter, and high mechanical strength.

No particular limitation is placed on the upper limit of the average aspect ratio, but it is generally not more than 5.

The columnar aluminum titanate of the present invention preferably contains magnesium. The magnesium content is preferably within the range of 0.5% to 2.0% by weight relative to the total amount of titanium and aluminum in terms of their respective oxides. If the magnesium content is below 0.5 in oxide terms, the resultant sintered body may not achieve a low coefficient of thermal expansion and high mechanical strength. On the other hand, if the magnesium content is above 2.0% by weight in oxide terms, the aluminum titanate may not have any columnar shape.

The columnar aluminum titanate of the present invention preferably has a number average major-axis length of 17 µm or more and a number average minor-axis length of 15 µm or less. Within these ranges, a sintered body can be obtained which has a lower coefficient of thermal expansion, a higher porosity, and higher mechanical strength. No particular limitation is placed on the upper limit of the number average major-axis length, but it is generally not more than 50 µm. No particular limitation is also placed on the lower limit of the number average minor-axis length, but it is generally not less than 3 µm. The number average major-axis length and the number average minor-axis length can be measured by a flow particle image analyzer, for example.

A production method of the present invention is a method that can produce the columnar aluminum titanate of the present invention, and is characterized by including the steps of: mixing a source material containing a titanium source, an aluminum source, and a magnesium source while mechanochemically milling the source material; and firing the milled mixture obtained.

In the production method of the present invention, a milled mixture is used which is obtained by mixing a source material containing a titanium source, an aluminum source, and a magnesium source while mechanochemically milling the source material. By firing such a milled mixture, columnar aluminum titanate can be produced which has an average aspect ratio of 1.5 or more, preferably 1.6 or more.

The temperature for firing the milled mixture is preferably within the temperature range of 1300° C. to 1600° C. By firing the milled mixture within this temperature range, the columnar aluminum titanate of the present invention can be more efficiently produced.

No particular limitation is placed on the firing time but the firing is preferably performed for 0.5 to 20 hours.

In the production method of the present invention, an example of the mechanochemical milling is a method of milling the source material while giving it physical impact. A specific example thereof is milling using a vibration mill. It can be assumed that by performing a milling process using a vibration mill, a disorder of atomic arrangement and a reduction of interatomic distance are concurrently caused by shear stress due to frictional grinding of the powder mixture, and this causes atom transfer at contact points between different kinds of particles, resulting in the formation of a metastable phase. Thus, a high reaction activity milled mixture is obtained. By firing the high reaction activity milled mixture, the columnar aluminum titanate of the present invention can be produced.

The mechanochemical milling in the present invention is performed in a dry process using neither water nor solvent.

No particular limitation is placed on the time of mixing involved in the mechanochemical milling, but it is generally preferably within the range of 0.1 to 6 hours.

The source material used in the present invention contains a titanium source, an aluminum source, and a magnesium source. Examples of the titanium source that can be used include compounds containing titanium oxide, and specific examples thereof include titanium oxide, rutile ores, wet cake of titanium hydroxide, and aqueous titania.

Examples of the aluminum source that can be used include compounds that can produce aluminum oxide by heat application, and specific examples thereof include aluminum oxide, aluminum hydroxide, and aluminum sulfate. Of these, aluminum oxide is particularly preferably used.

The mixing ratio of the titanium source and the aluminum source is basically Ti:Al=1:2 (in molar ratio). However, a change of plus or minus about 10% in content of each source will present no problem.

Examples of the magnesium source that can be used include compounds that can produce magnesium oxide by heat application, and specific examples thereof include magnesium hydroxide, magnesium oxide, and magnesium carbonate. Of these, magnesium hydroxide and magnesium oxide are particularly preferably used.

The magnesium source is preferably contained in the source material to give a content of 0.5% to 2.0% by weight relative to the total amount of the titanium source and the aluminum source in terms of their respective oxides. If the magnesium content is below 0.5% by weight, a sintered body having a low coefficient of thermal expansion and high mechanical strength may not be obtained. On the other hand, if the magnesium content is above 2.0% by weight, columnar aluminum titanate having an average aspect ratio of 1.5 or more may not be obtained.

Furthermore, in the production method of the present invention, a silicon source may be further contained in the source material.

By containing a silicon source in the source material, the decomposition of aluminum titanate can be reduced, whereby columnar aluminum titanate excellent in high-temperature stability can be produced.

Examples of the silicon source include silicon oxide and silicon. Of these, silicon oxide is particularly preferably used. The content of the silicon source in the source material is preferably within the range of 0.5% to 10% by weight relative to the total amount of the titanium source and the aluminum source in terms of their respective oxides. If the content of the silicon source is within the above range, columnar aluminum titanate can be more stably produced.

A sintered aluminum titanate body of the present invention is characterized by being obtained by sintering a green body containing the above columnar aluminum titanate of the present invention or columnar aluminum titanate produced by the above production method of the present invention.

Since the sintered aluminum titanate body of the present invention is obtained by sintering a green body containing the above columnar aluminum titanate of the present invention or columnar aluminum titanate produced by the above method of the present invention, it has a low coefficient of thermal expansion, a large pore diameter, and high mechanical strength.

The above columnar aluminum titanate of the present invention or columnar aluminum titanate produced by the above method of the present invention has a low coefficient of thermal expansion and may have a negative coefficient of thermal expansion. When columnar aluminum titanate having a negative coefficient of thermal expansion is used, it can be used in mixture with aluminum titanate having a positive coefficient of thermal expansion to control the coefficient of thermal expansion of the resultant sintered body closer to zero. In the sintered aluminum titanate body of the present invention, the purpose of use of columnar aluminum titanate is not limited to the control of coefficient of thermal expansion; for other purposes, different kinds of columnar aluminum titanates of the present invention may be used in a mixture or columnar aluminum titanate of the present invention may be used in mixture with not-inventive aluminum titanate. Alternatively, a sintered body may be produced by mixing columnar aluminum titanate of the present invention and a compound other than aluminum titanate.

The sintered aluminum titanate body in the present invention can be produced by preparing a mixture composition in which, for example, a pore forming agent, a binder, a dispersant, and water are added to aluminum titanate, forming the mixture composition into a green body providing a honeycomb structure, for example, by using an extruder, sealing one of two end openings of each cell of the honeycomb structure so that the cell end openings at each end of the honeycomb structure are arranged in a checkered pattern, drying the obtained green body and then firing the green body. The firing temperature is, for example, 1400° C. to 1600° C.

Examples of the pore forming agent include graphite, wood powder, and polyethylene. Examples of the binder include methylcellulose, ethylcellulose, and polyvinyl alcohol. Examples of the dispersant include fatty acid soap and ethylene glycol. The amounts of pore forming agent, binder, dispersant, and water can be appropriately controlled.

Advantageous Effects of Invention

Since the columnar aluminum titanate of the present invention has a low coefficient of thermal expansion and an aspect ratio of 1.5 or more, a sintered body having a low coefficient of thermal expansion, a large pore diameter, and high mechanical strength can be obtained using the columnar aluminum titanate of the present invention.

In the production method of the present invention, the columnar aluminum titanate of the present invention can be efficiently produced.

DESCRIPTION OF EMBODIMENTS

Hereinafter, the present invention will be described in detail with reference to specific examples, but is not limited by the following examples.

Production Method of Columnar Aluminum Titanate

Example 1

An amount of 360.0 g of titanium oxide, 411.1 g of aluminum oxide, 9.7 g of magnesium hydroxide, and 19.2 g of silicon oxide were mixed for 2.0 hours while being milled by a vibration mill.

An amount of 500 g of the milled mixture obtained in the above manner was packed into a crucible and then fired at 1500° C. for four hours in an electric furnace.

Figure 13:
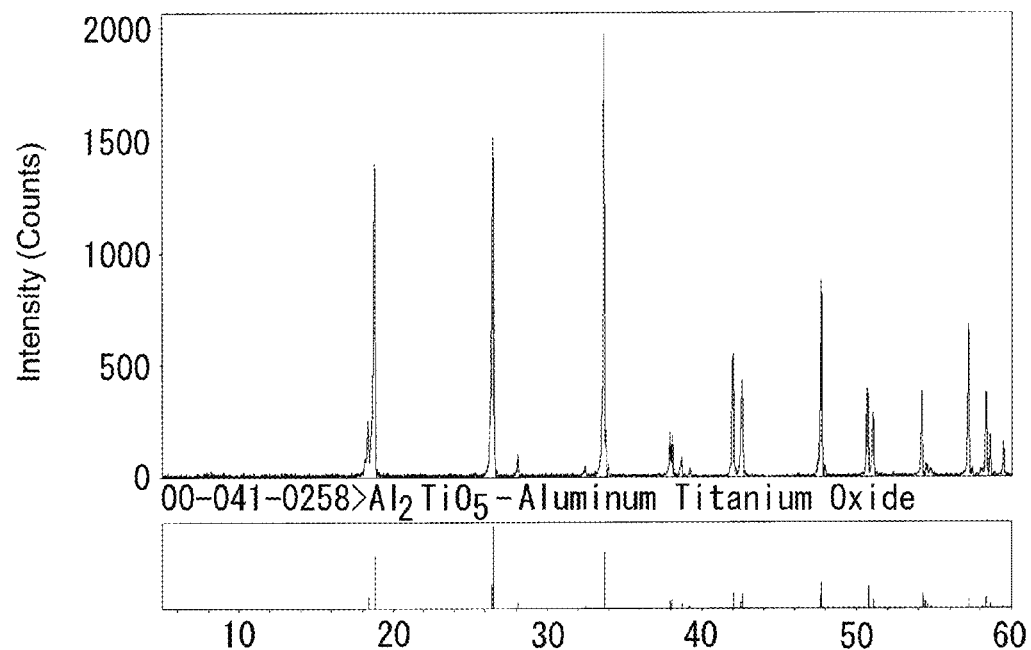
FIG. 13 is a graph showing an X-ray diffraction pattern chart of columnar aluminum titanate of Example 1 of the present invention.

An X-ray diffraction pattern chart of the obtained product is shown in FIG. 13. As shown in FIG. 13, the obtained product was $Al_2TiO_5$. The peaks shown at the bottom of FIG. 13 are those of $Al_2TiO_5$ from JCPDS.

Figure 1:
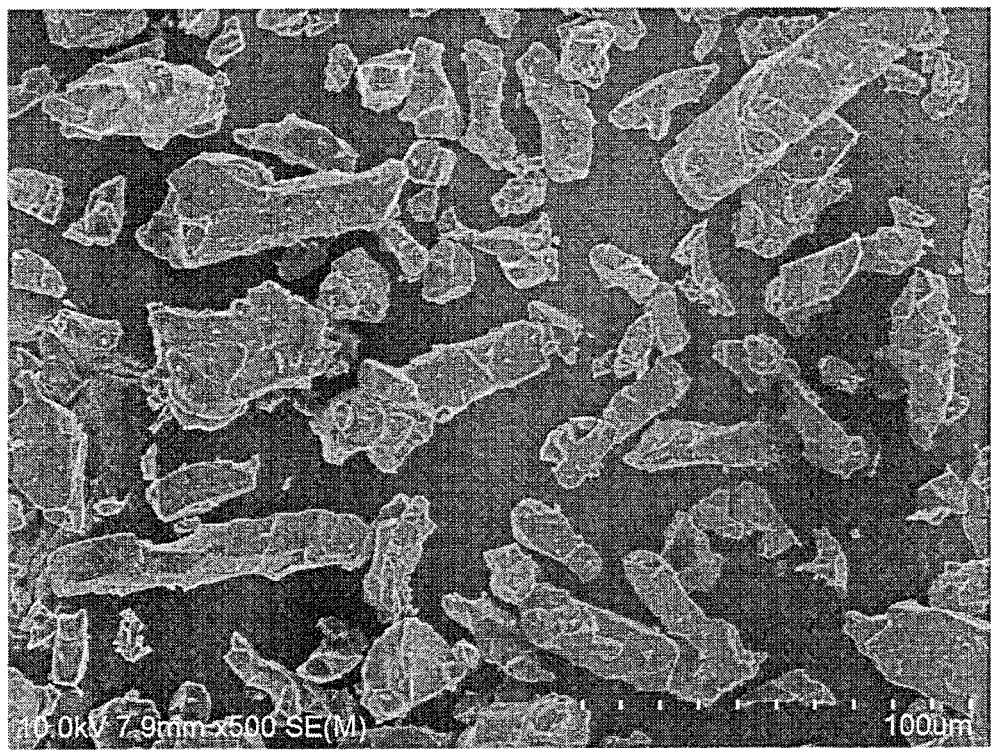
FIG. 1 is a scanning electron micrograph showing columnar aluminum titanate of Example 1 of the present invention.

The obtained aluminum titanate was observed with a scanning electron microscope. FIG. 1 is a photograph from the scanning electron microscope (SEM) showing the obtained aluminum titanate. As is obvious from FIG. 1, columnar aluminum titanate was obtained.

Figure 7:
FIG. 7 shows particle images measured by a flow particle image analyzer in Example 1 of the present invention.

Furthermore, the obtained aluminum titanate was measured, by a flow particle image analyzer, in terms of number average major-axis length, number average minor-axis length, and average aspect ratio (=(number average major-axis length)/(number average minor-axis length)). FIG. 7 shows particle images measured by the flow particle image analyzer. The number average major-axis length was 21.7 μm, the number average minor-axis length was 12.6 μm, and the average aspect ratio was 1.72.

The amount of magnesium hydroxide added and the magnesium content in aluminum titanate in this example are 0.87% by weight in terms of magnesium oxide relative to the total amount of titanium oxide and aluminum oxide.

Example 2

An amount of 355.7 g of titanium oxide, 406.1 g of aluminum oxide, 18.8 g of magnesium hydroxide, and 19.0 g of silicon oxide were mixed for 2.0 hours while being milled by a vibration mill.

An amount of 500 g of the milled mixture obtained in the above manner was packed into a crucible and then fired at 1500° C. for four hours in an electric furnace.

Figure 14:
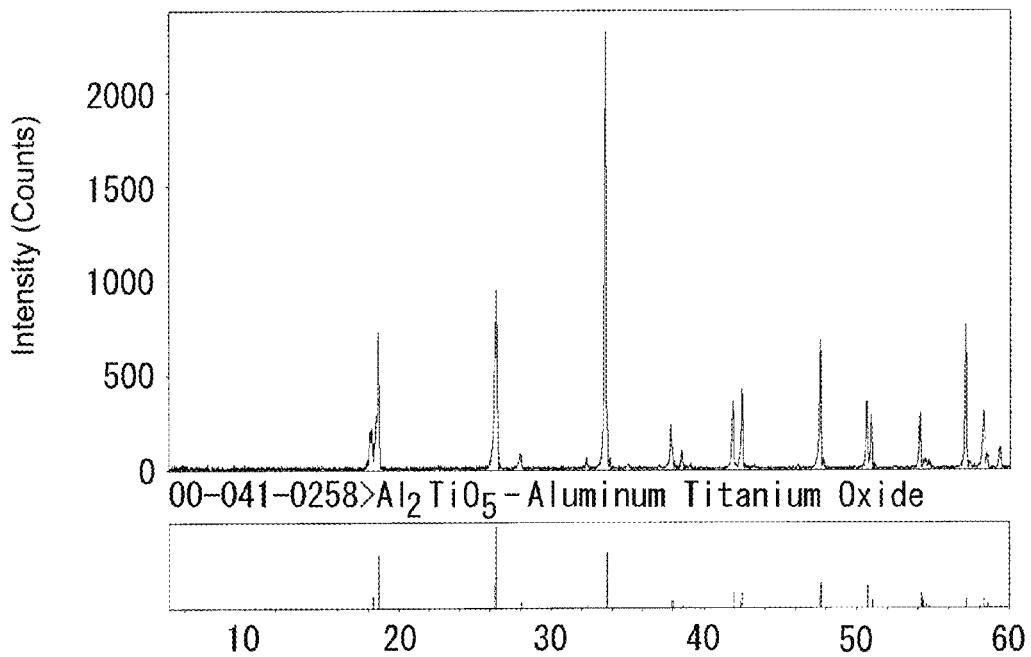
FIG. 14 is a graph showing an X-ray diffraction pattern chart of columnar aluminum titanate of Example 2 of the present invention.

An X-ray diffraction pattern chart of the obtained product is shown in FIG. 14. As shown in FIG. 14, the obtained product was $Al_2TiO_5$. The peaks shown at the bottom of FIG. 14 are those of $Al_2TiO_5$ from JCPDS.

Figure 2:
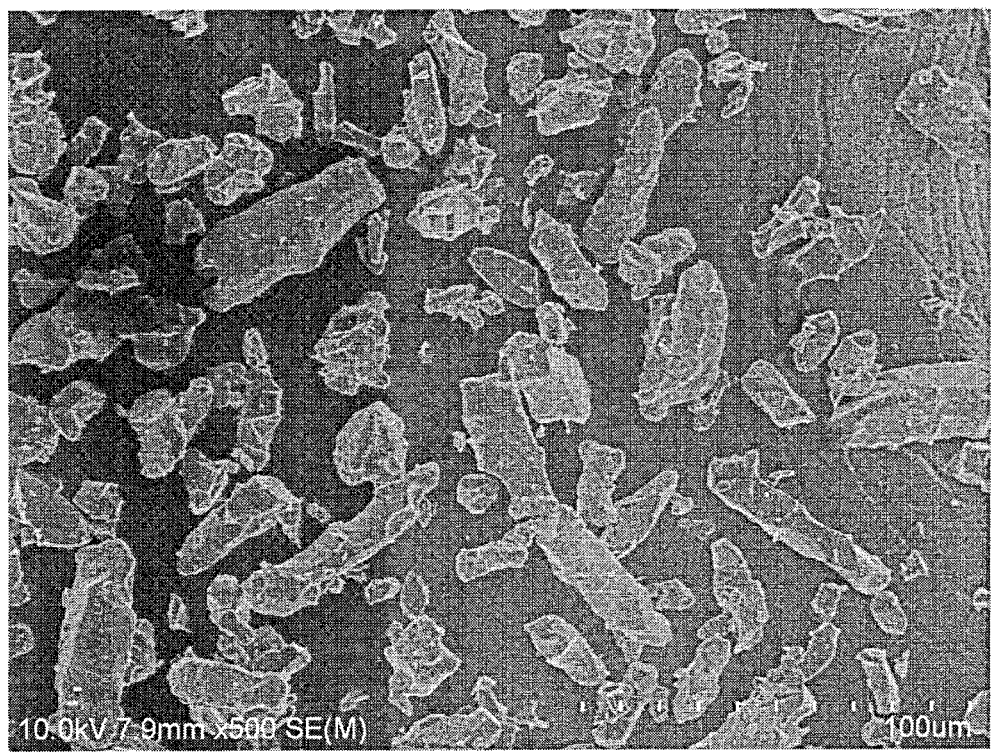
FIG. 2 is a scanning electron micrograph showing columnar aluminum titanate of Example 2 of the present invention.

The obtained aluminum titanate was observed with a scanning electron microscope. FIG. 2 is a photograph from the scanning electron microscope (SEM) showing the obtained aluminum titanate. As is obvious from FIG. 2, columnar aluminum titanate was obtained.

Figure 8:
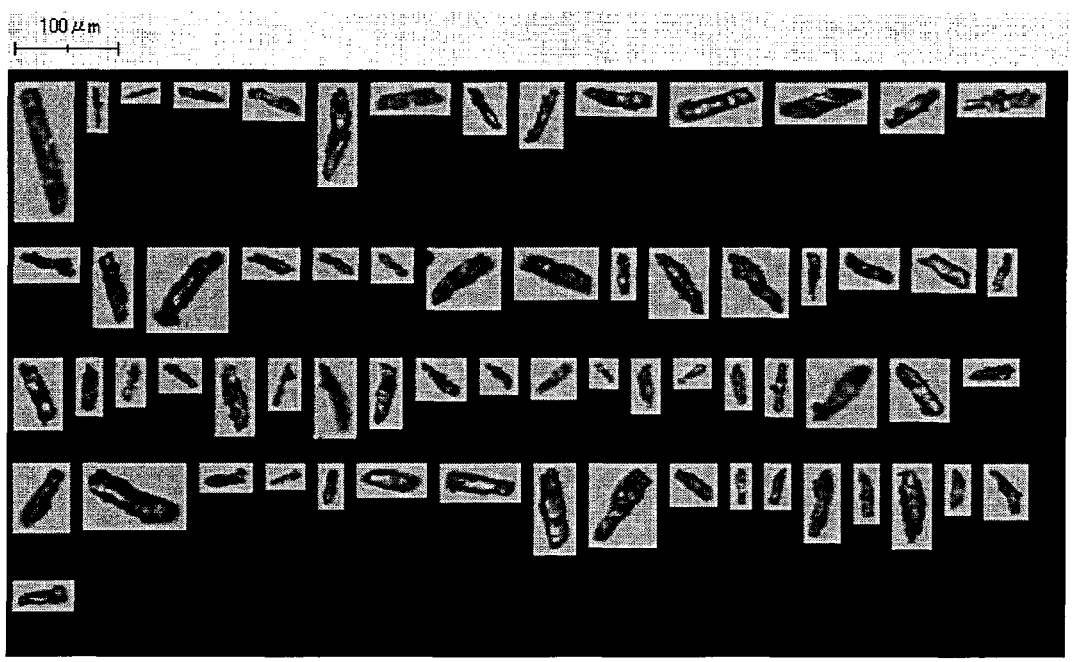
FIG. 8 shows particle images measured by a flow particle image analyzer in Example 2 of the present invention.

Furthermore, the obtained aluminum titanate was measured, by a flow particle image analyzer, in terms of number average major-axis length, number average minor-axis length, and average aspect ratio (=(number average major-axis length)/(number average minor-axis length)). FIG. 8 shows particle images measured by the flow particle image analyzer. The number average major-axis length was 19.5 μm, the number average minor-axis length was 11.8 μm, and the average aspect ratio was 1.65.

The amount of magnesium hydroxide added and the magnesium content in aluminum titanate in this example are 1.71% by weight in terms of magnesium oxide relative to the total amount of titanium oxide and aluminum oxide.

Comparative Example 1

An amount of 351.5 g of titanium oxide, 401.3 g of aluminum oxide, 28.5 g of magnesium hydroxide, and 18.7 g of silicon oxide were mixed for 2.0 hours while being milled by a vibration mill.

An amount of 500 g of the milled mixture obtained in the above manner was packed into a crucible and then fired at 1500° C. for four hours in an electric furnace.

Figure 15:
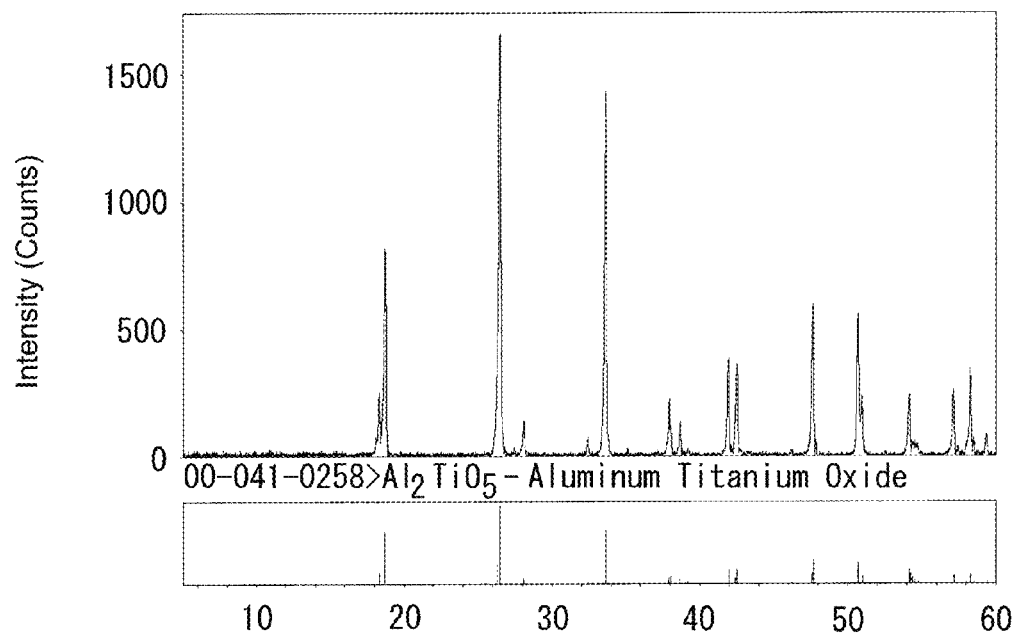
FIG. 15 is a graph showing an X-ray diffraction pattern chart of granular aluminum titanate of Comparative Example 1.

An X-ray diffraction pattern chart of the obtained product is shown in FIG. 15. As shown in FIG. 15, the obtained product was $Al_2TiO_5$. The peaks shown at the bottom of FIG. 15 are those of $Al_2TiO_5$ from JCPDS.

Figure 3:
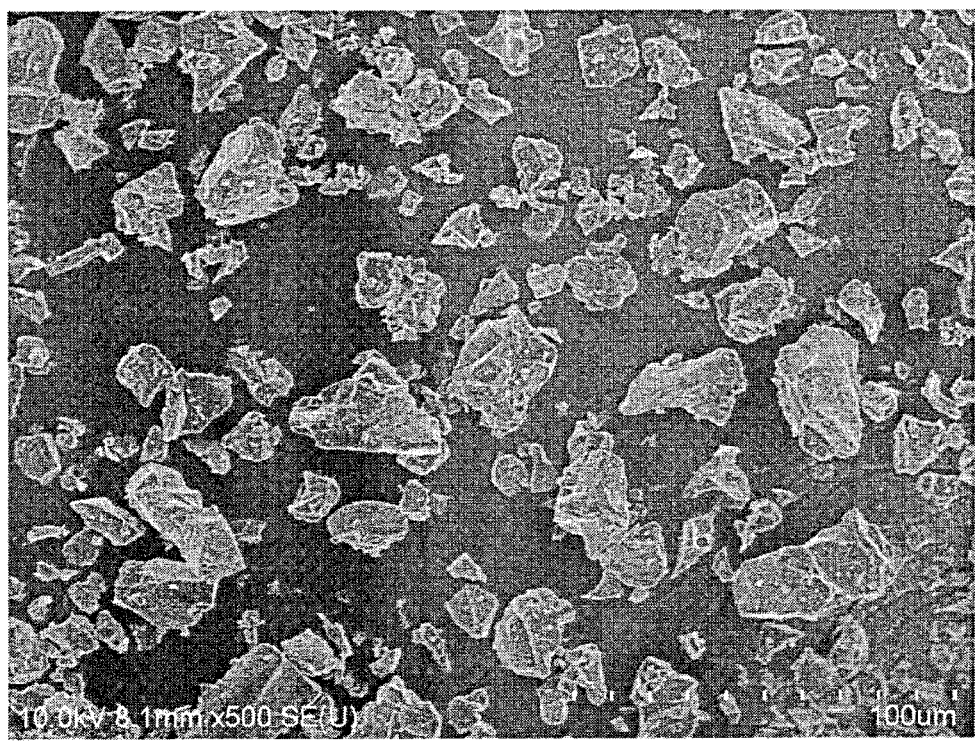
FIG. 3 is a scanning electron micrograph showing granular aluminum titanate of Comparative Example 1.

The obtained aluminum titanate was observed with a scanning electron microscope. FIG. 3 is a photograph from the scanning electron microscope (SEM) showing the obtained aluminum titanate. As is obvious from FIG. 3, it can be seen that aluminum titanate obtained in this comparative example is not columnar, unlike Examples 1 and 2, but granular.

Figure 9:
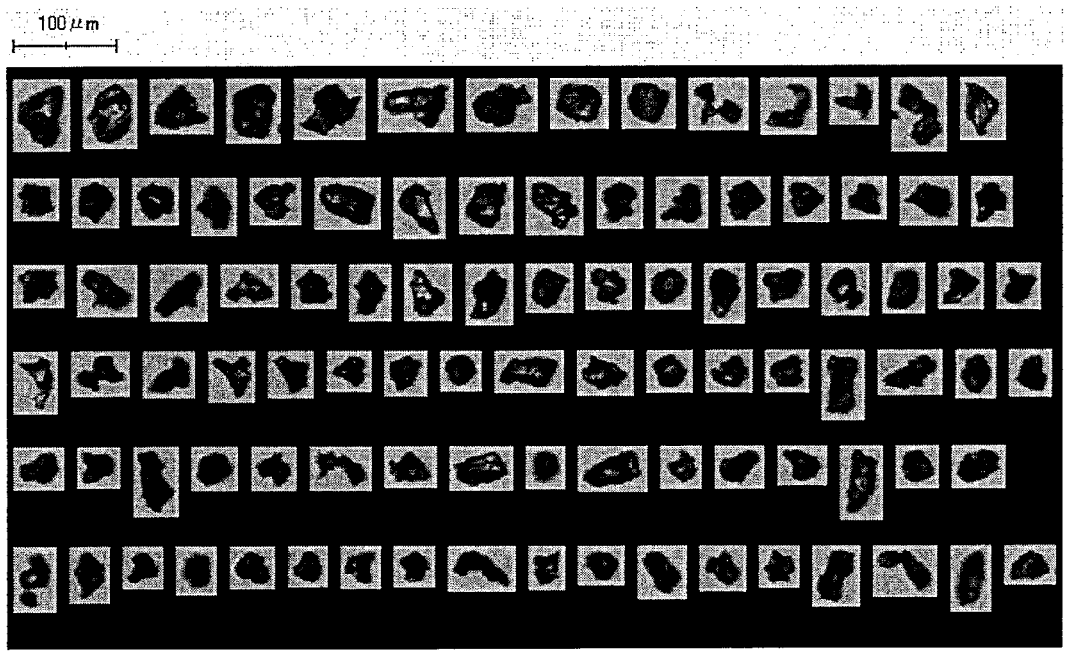
FIG. 9 shows particle images measured by a flow particle image analyzer in Comparative Example 1.

Furthermore, the obtained aluminum titanate was measured, by a flow particle image analyzer, in terms of number average major-axis length, number average minor-axis length, and average aspect ratio (=(number average major-axis length)/(number average minor-axis length)). FIG. 9 shows particle images measured by the flow particle image analyzer. The number average major-axis length was 12.3 μm, the number average minor-axis length was 8.3 μm, and the average aspect ratio was 1.48.

The amount of magnesium hydroxide added and the magnesium content in aluminum titanate in this comparative example are 2.62% by weight in terms of magnesium oxide relative to the total amount of titanium oxide and aluminum oxide.

Comparative Example 2

An amount of 360.0 g of titanium oxide, 411.1 g of aluminum oxide, 9.7 g of magnesium hydroxide, and 19.2 g of silicon oxide were mixed for 0.5 hours by a Henschel mixer.

An amount of 500 g of the mixture obtained in the above manner was packed into a crucible and then fired at 1500° C. for four hours in an electric furnace.

Figure 16:
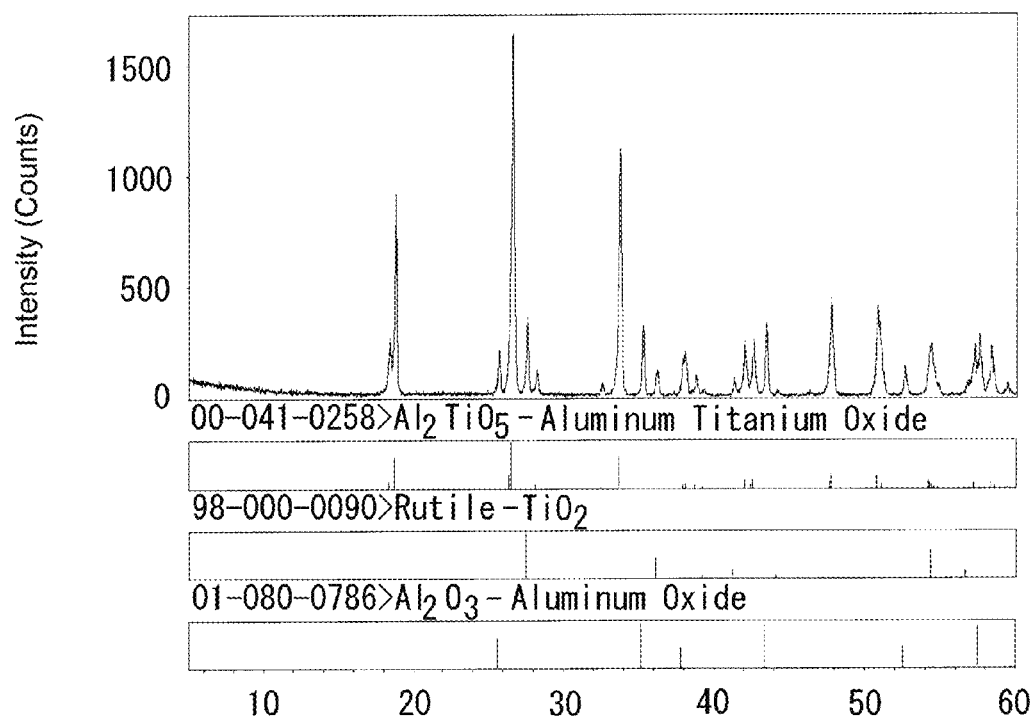
FIG. 16 is a graph showing an X-ray diffraction pattern chart of granular aluminum titanate of Comparative Example 2.

An X-ray diffraction pattern chart of the obtained product is shown in FIG. 16. As shown in FIG. 16, the obtained product was a mixture of $Al_2TiO_5$, $TiO_2$, and $Al_2O_3$. The peaks shown in the lower part of FIG. 16 are those of $Al_2O_3$ (aluminum oxide), $TiO_2$ (rutile titanium oxide) and $Al_2TiO_3$ (aluminum titanate) from JCPDS in order from the bottom.

Figure 4:
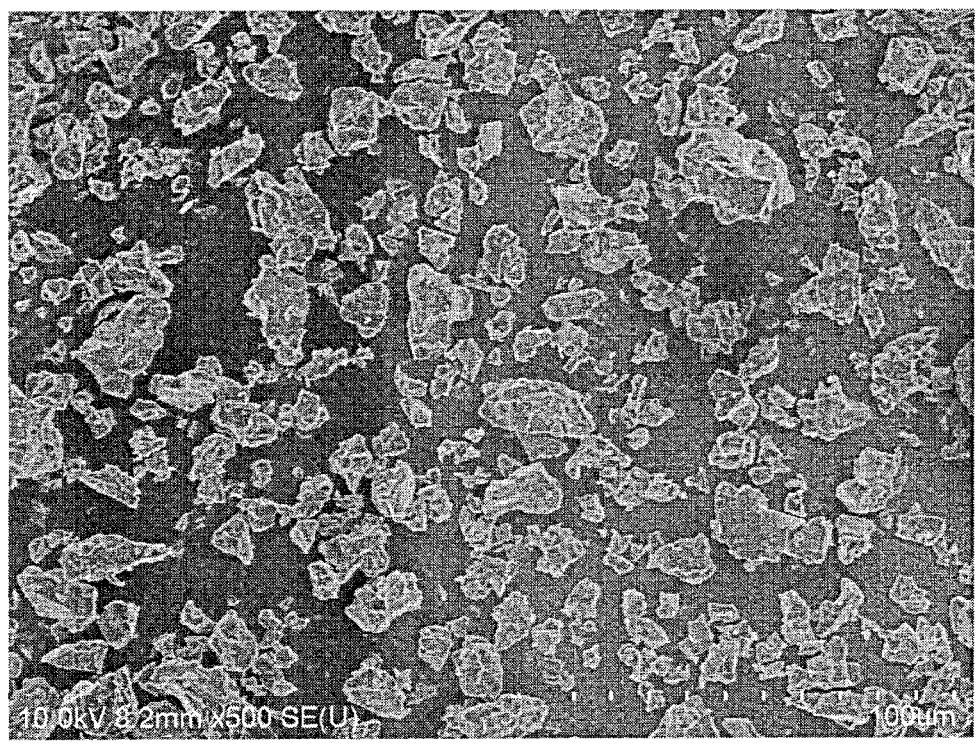
FIG. 4 is a scanning electron micrograph showing granular aluminum titanate of Comparative Example 2.

The obtained aluminum titanate was observed with a scanning electron microscope. FIG. 4 is a photograph from the scanning electron microscope (SEM) showing the obtained aluminum titanate. As is obvious from FIG. 4, it can be seen that aluminum titanate obtained in this comparative example is not columnar, unlike Examples 1 and 2, but granular.

Figure 10:
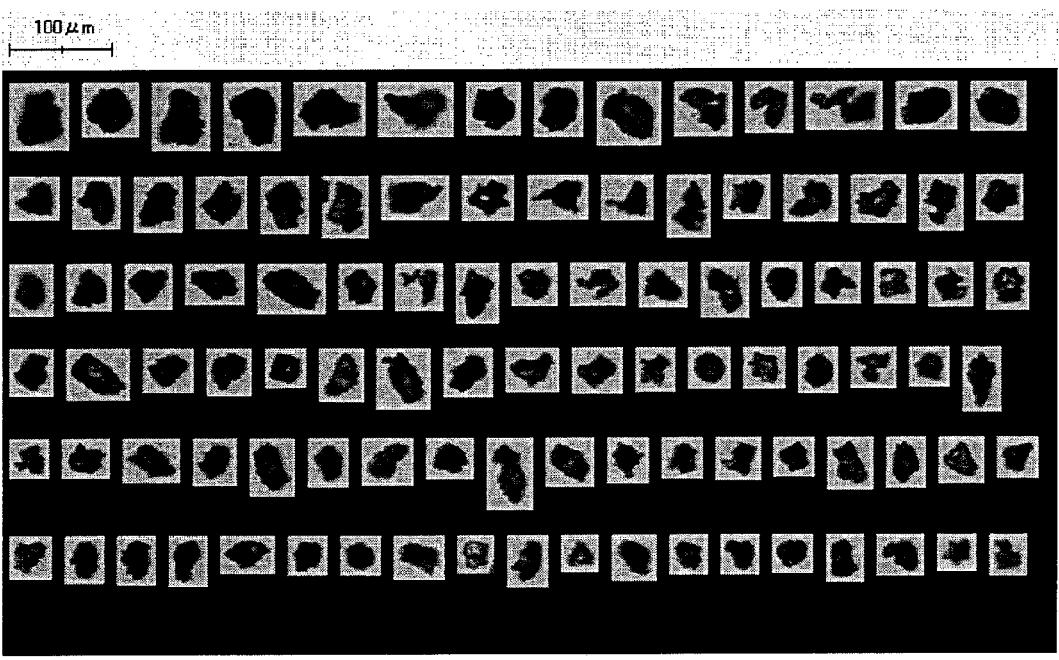
FIG. 10 shows particle images measured by a flow particle image analyzer in Comparative Example 2.

Furthermore, the obtained aluminum titanate was measured, by a flow particle image analyzer, in terms of number average major-axis length, number average minor-axis length, and average aspect ratio (=(number average major-axis length)/(number average minor-axis length)). FIG. 10 shows particle images measured by the flow particle image analyzer. The number average major-axis length was 11.5 µm, the number average minor-axis length was 7.9 µm, and the average aspect ratio was 1.46.

The amount of magnesium hydroxide added and the magnesium content in aluminum titanate in this comparative example are 0.87% by weight in terms of magnesium oxide relative to the total amount of titanium oxide and aluminum oxide.

Comparative Example 3

An amount of 355.7 g of titanium oxide, 406.1 g of aluminum oxide, 18.8 g of magnesium hydroxide, and 19.0 g of silicon oxide were mixed for 0.5 hours by a Henschel mixer.

An amount of 500 g of the mixture obtained in the above manner was packed into a crucible and then fired at 1500° C. for four hours in an electric furnace.

Figure 17:
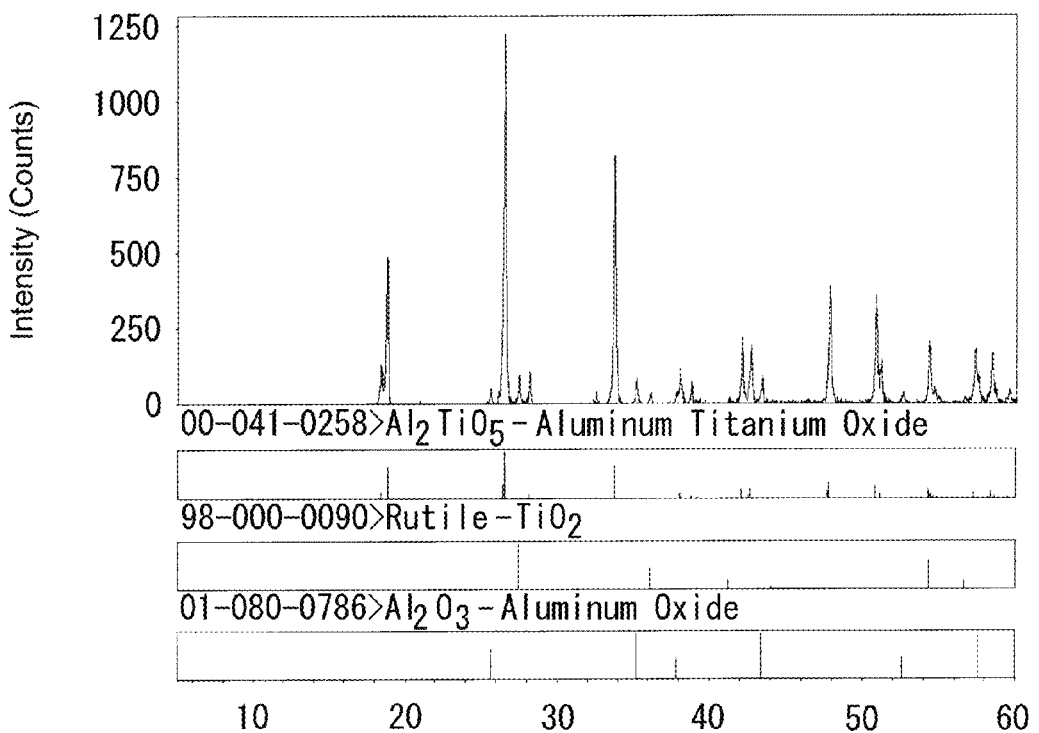
FIG. 17 is a graph showing an X-ray diffraction pattern chart of granular aluminum titanate of Comparative Example 3.

An X-ray diffraction pattern chart of the obtained product is shown in FIG. 17. As shown in FIG. 17, the obtained product was a mixture of $Al_2TiO_5$, $TiO_2$, and $Al_2O_3$. The peaks shown in the lower part of FIG. 17 are those of $Al_2O_3$ (aluminum oxide), $TiO_2$ (rutile titanium oxide) and $Al_2TiO_5$ (aluminum titanate) from JCPDS in order from the bottom.

Figure 5:
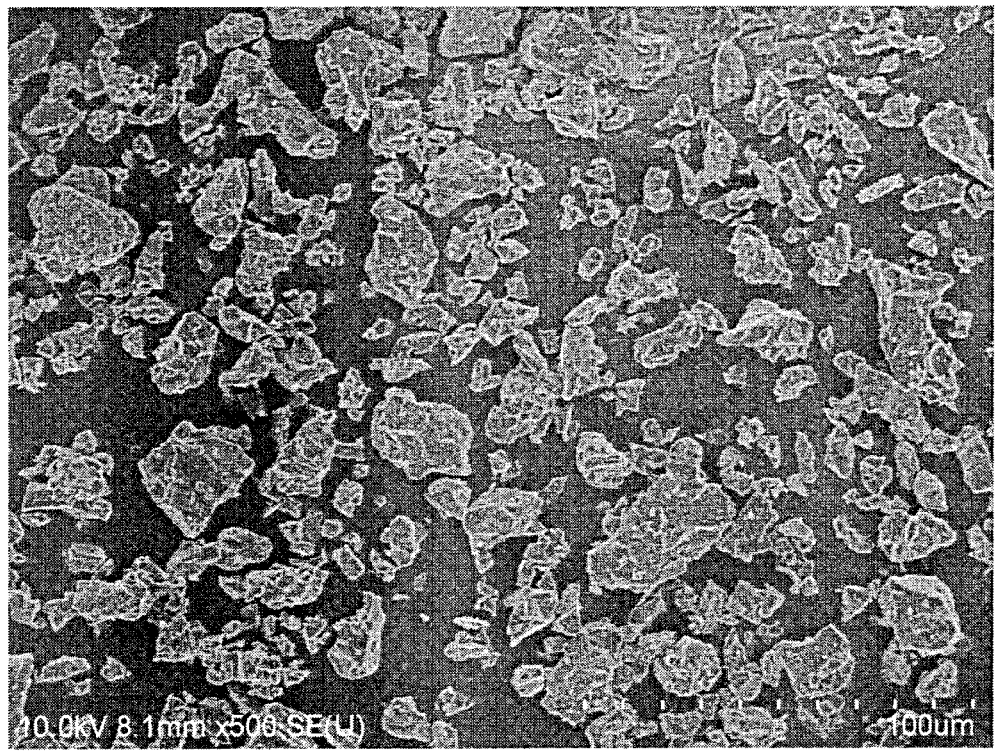
FIG. 5 is a scanning electron micrograph showing granular aluminum titanate of Comparative Example 3.

The obtained aluminum titanate was observed with a scanning electron microscope. FIG. 5 is a photograph from the scanning electron microscope (SEM) showing the obtained aluminum titanate. As is obvious from FIG. 5, it can be seen that aluminum titanate obtained in this comparative example is not columnar, unlike Examples 1 and 2, but granular.

Figure 11:
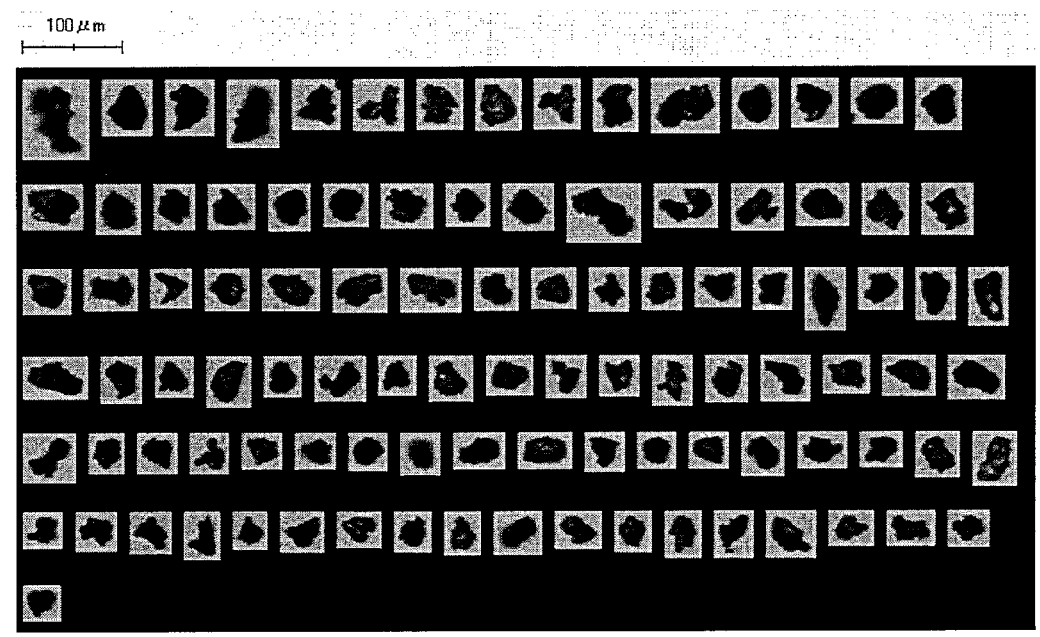
FIG. 11 shows particle images measured by a flow particle image analyzer in Comparative Example 3.

Furthermore, the obtained aluminum titanate was measured, by a flow particle image analyzer, in terms of number average major-axis length, number average minor-axis length, and average aspect ratio (=(number average major-axis length)/(number average minor-axis length)). FIG. 11 shows particle images measured by the flow particle image analyzer. The number average major-axis length was 11.4 µm, the number average minor-axis length was 7.8 µm, and the average aspect ratio was 1.47.

The amount of magnesium hydroxide added and the magnesium content in aluminum titanate in this comparative example are 1.71% by weight in terms of magnesium oxide relative to the total amount of titanium oxide and aluminum oxide.

Comparative Example 4

An amount of 302.3 g of titanium oxide, 423.2 g of aluminum oxide, 29.6 g of silicon oxide, and 323.7 g of water were mixed for three hours while being milled by a ball mill.

The milled mixture obtained in the above manner was dried at 110° C., and 500 g of the dried mixture was packed into a crucible and then fired at 1500° C. for four hours in an electric furnace.

Figure 18:
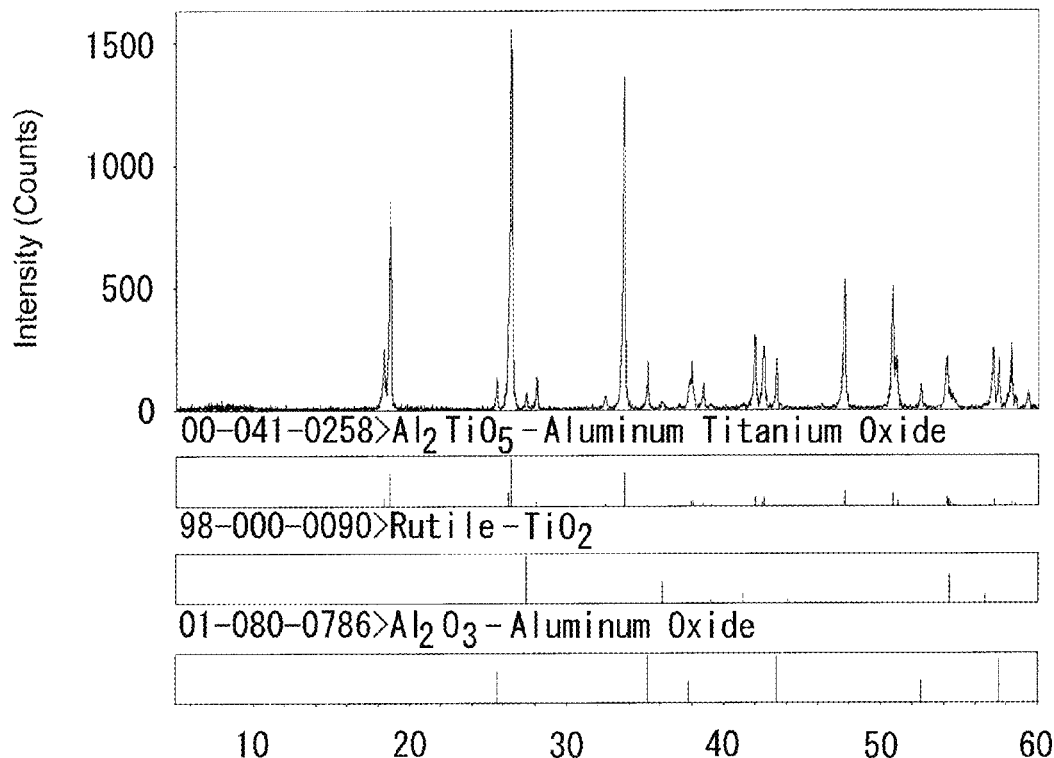
FIG. 18 is a graph showing an X-ray diffraction pattern chart of granular aluminum titanate of Comparative Example 4.

An X-ray diffraction pattern chart of the obtained product is shown in FIG. 18. As shown in FIG. 18, the obtained product was a mixture of $Al_2TiO_5$, $TiO_2$, and $Al_2O_3$. The peaks shown in the lower part of FIG. 18 are those of $Al_2O_3$ (aluminum oxide), $TiO_2$ (rutile titanium oxide) and $Al_2TiO_5$ (aluminum titanate) from JCPDS in order from the bottom.

Figure 6:
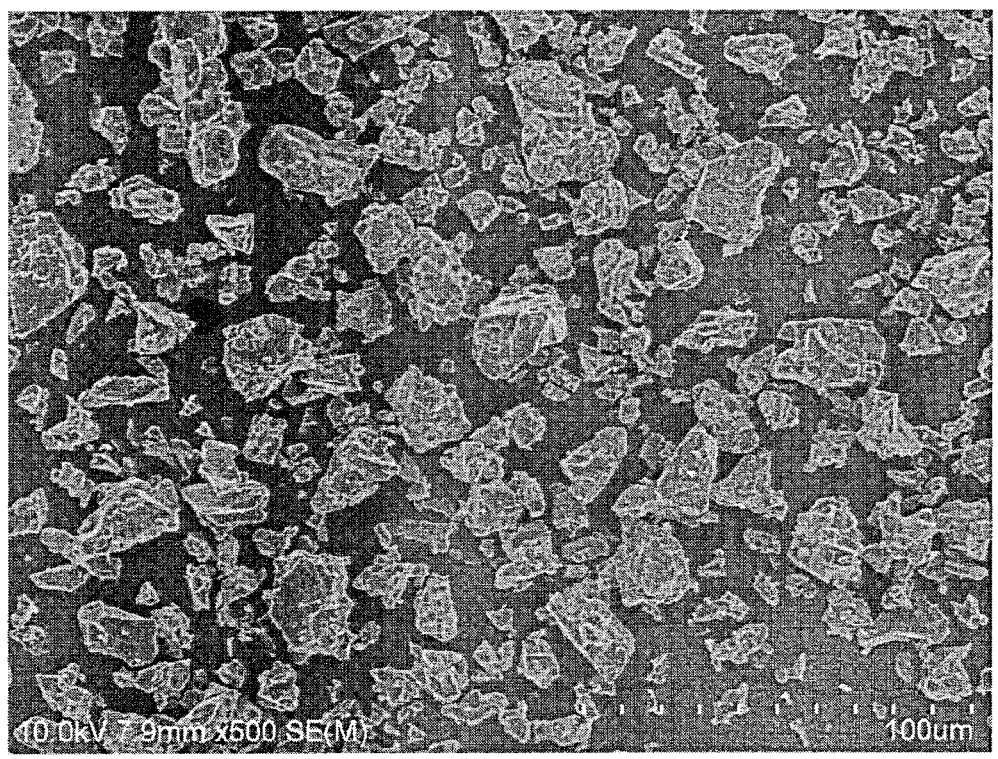
FIG. 6 is a scanning electron micrograph showing granular aluminum titanate of Comparative Example 4.

The obtained aluminum titanate was observed with a scanning electron microscope. FIG. 6 is a photograph from the scanning electron microscope (SEM) showing the obtained aluminum titanate. As is obvious from FIG. 6, it can be seen that aluminum titanate obtained in this comparative example is not columnar, unlike Examples 1 and 2, but granular.

Figure 12:
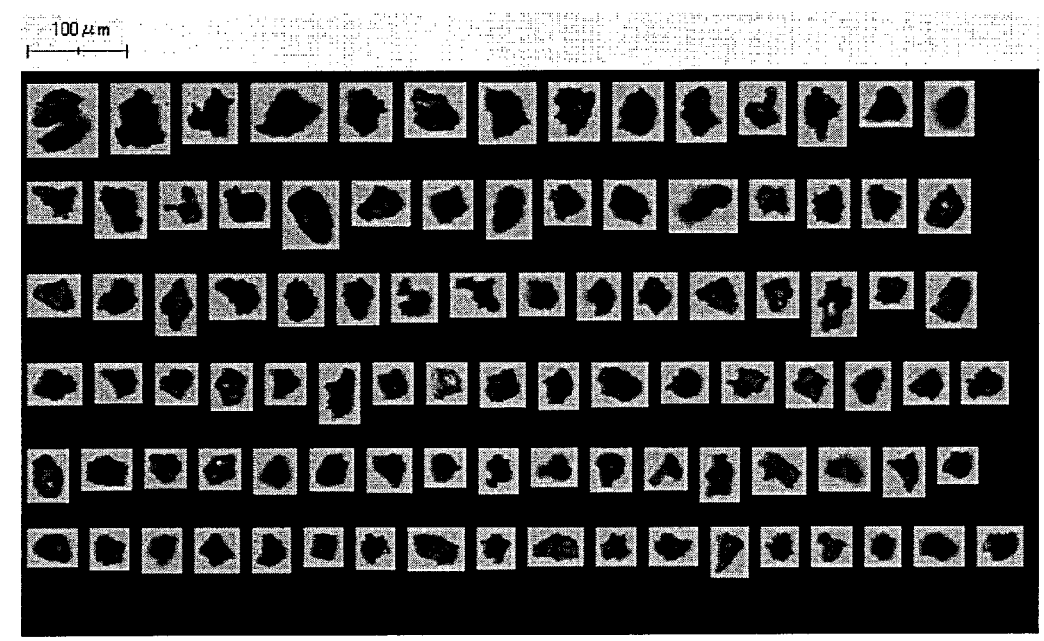
FIG. 12 shows particle images measured by a flow particle image analyzer in Comparative Example 4.

Furthermore, the obtained aluminum titanate was measured, by a flow particle image analyzer, in terms of number average major-axis length, number average minor-axis length, and average aspect ratio (=(number average major-axis length)/(number average minor-axis length)). FIG. 12 shows particle images measured by the flow particle image analyzer. The number average major-axis length was 11.7 µm, the number average minor-axis length was 8.1 µm, and the average aspect ratio was 1.44.

Table 1 shows the X-ray diffraction results, the number average major-axis lengths, the number average minor-axis lengths, and the average aspect ratios of the products of aluminum titanate of Examples 1 and 2 and Comparative Examples 1, 2, 3, and 4 obtained in the above manners.

TABLE 1

| | Powder Characteristics | | | | | |
|---|---|---|---|---|---|---|
| | Amount of Magnesium Hydroxide Added in Terms of MgO (wt %) | Mixing Method | X-Ray Diffraction | Major-Axis Length (µm) | Minor-Axis Length (µm) | Aspect Ratio |
| Ex. 1 | 0.87 | Vibration mill | $Al_2TiO_5$ | 21.7 | 12.6 | 1.72 |
| Ex. 2 | 1.71 | Vibration mill | $Al_2TiO_5$ | 19.5 | 11.8 | 1.65 |
| Comp. Ex. 1 | 2.62 | Vibration mill | $Al_2TiO_5$ | 12.3 | 8.3 | 1.48 |
| Comp. Ex. 2 | 0.87 | Henschel | $Al_2TiO_5 + TiO_2 + Al_2O_3$ | 11.5 | 7.9 | 1.46 |
| Comp. Ex. 3 | 1.71 | Henschel | $Al_2TiO_5 + TiO_2 + Al_2O_3$ | 11.4 | 7.8 | 1.47 |
| Comp. Ex. 4 | 0.00 | Wet ball mill | $Al_2TiO_5 + TiO_2 + Al_2O_3$ | 11.7 | 8.1 | 1.44 |

Production of Sintered Aluminum Titanate Body

Example 3

Compounded into 100 parts by weight of the columnar aluminum titanate particles obtained in Example 1 were 20 parts by weight of graphite, 10 parts by weight of methylcellulose, and 0.5 parts by weight of fatty acid soap. A suitable amount of water was also added to the mixture, and the mixture was then kneaded to obtain an extrudable clay.

The obtained clay was extruded and formed into a honeycomb structure by an extruder, and the obtained green body was next dried by a microwave dryer and a hot-air dryer and then fired at 1500° C. to obtain a sintered aluminum titanate body.

Example 4

Compounded into 100 parts by weight of the columnar aluminum titanate particles obtained in Example 2 were 20 parts by weight of graphite, 10 parts by weight of methylcellulose, and 0.5 parts by weight of fatty acid soap. A suitable amount of water was also added to the mixture, and the mixture was then kneaded to obtain an extrudable clay.

The obtained clay was extruded and formed into a honeycomb structure by an extruder, and the obtained green body was next dried by a microwave dryer and a hot-air dryer and then fired at 1500° C. to obtain a sintered aluminum titanate body.

Example 5

An amount of 70 parts by weight of the columnar aluminum titanate particles obtained in Example 1 were mixed with 30 parts by weight of the granular aluminum titanate particles obtained in Comparative Example 4. Compounded into 100 parts by weight of the resultant mixed aluminum titanate particles were 20 parts by weight of graphite, 10 parts by weight of methylcellulose, and 0.5 parts by weight of fatty acid soap. A suitable amount of water was also added to the mixture, and the mixture was then kneaded to obtain an extrudable clay.

The obtained clay was extruded and formed into a honeycomb structure by an extruder, and the obtained green body was next dried by a microwave dryer and a hot-air dryer and then fired at 1500° C. to obtain a sintered aluminum titanate body.

Comparative Example 5

Compounded into 100 parts by weight of the granular aluminum titanate particles obtained in Comparative Example 4 were 20 parts by weight of graphite, 10 parts by weight of methylcellulose, and 0.5 parts by weight of fatty acid soap. A suitable amount of water was also added to the mixture, and the mixture was then kneaded to obtain an extrudable clay.

The obtained clay was extruded and formed into a honeycomb structure by an extruder, and the obtained green body was next dried by a microwave dryer and a hot-air dryer and then fired at 1500° C. to obtain a sintered aluminum titanate body.

Evaluation of Sintered Aluminum Titanate Body

The sintered aluminum titanate bodies obtained in Examples 3 to 5 and Comparative Example 5 were measured in terms of porosity, pore diameter, bending strength, and coefficient of thermal expansion. The porosity, pore diameter, bending strength, and coefficient of thermal expansion were measured in conformity with JIS R1634, JIS R1655, JIS R1601, and JIS R1618, respectively. The measurement results are shown in Table 2.

TABLE 2

| | Sintered Body Characteristics | | | |
| --- | --- | --- | --- | --- |
| | Porosity (%) | Pore Diameter (μm) | Strength (MPa) | CTE ×10$^{-6}$/° C. |
| Ex. 3 | 39.2 | 8.4 | 7.5 | −1.2 |
| Ex. 4 | 40.3 | 7.9 | 7.4 | −1.0 |
| Ex. 5 | 39.0 | 7.1 | 6.5 | 0.1 |
| Comp. Ex. 5 | 38.7 | 4.6 | 4.3 | 2.1 |

As shown in Table 2, it can be seen that the sintered aluminum titanate bodies of Examples 3 to 5 produced using columnar aluminum titanate of the present invention have larger pore diameters, higher mechanical strength, and lower coefficients of thermal expansion than the sintered aluminum titanate body of Comparative Example 5. It can be therefore seen that the sintered aluminum titanate body of the present invention has low thermal expansivity, excellent thermal shock resistance, high mechanical strength, and high efficiency of particulate capture.

In addition, as is obvious from Example 5, the thermal expansivity of the sintered body can be controlled by mixing columnar aluminum titanate with conventional granular aluminum titanate.

The invention claimed is:

1. A columnar aluminum titanate having an average aspect ratio of 1.5 or more,
    wherein the average aspect ratio is equal to number average major-axis length divided by number average minor-axis length, and
    wherein the columnar aluminum titanate is powder.

2. The columnar aluminum titanate according to claim 1, wherein a content of magnesium within the columnar aluminum titanate is 0.5% to 2.0% by weight relative to the total amount of titanium and aluminum, in terms of their respective oxides.

3. The columnar aluminum titanate according to claim 1, having a number average major-axis length of 17 μm or more and a number average minor-axis length of 15 μm or less.

4. A method for producing the columnar aluminum titanate according to claim 1, the method comprising:
    mixing a source material containing a titanium source, an aluminum source, and a magnesium source while mechanochemically milling the source material; and then
    firing the milled mixture.

5. The method for producing the columnar aluminum titanate according to claim 4, wherein the firing step is at a temperature range of 1300° C. to 1600° C.

6. The method for producing the columnar aluminum titanate according to claim 4, wherein the magnesium source is contained in the source material to give a content of 0.5% to 2.0% by weight relative to the total amount of the titanium source and the aluminum source in terms of their respective oxides.

7. The method for producing the columnar aluminum titanate according to claim 4, wherein the source material further comprises a silicon source.

8. The method for producing the columnar aluminum titanate according to claim 7, wherein the silicon source is contained in the source material to give a content of 0.5% to 10% by weight relative to the total amount of the titanium source and the aluminum source in terms of their respective oxides.

9. A sintered aluminum titanate body obtained by sintering a green body containing the columnar aluminum titanate according to claim 1.

10. A sintered aluminum titanate body obtained by sintering a green body,
wherein the green body comprises the columnar aluminum titanate produced by the method according to claim 4 and a compound other than aluminum titanate.

11. The sintered aluminum titanate body according to claim 10, wherein the compound other than aluminum titanate is selected from the group consisting of pore forming agent, binder, dispersant and water.

* * * * *